US010110683B2

(12) United States Patent
Smith et al.

(10) Patent No.: US 10,110,683 B2
(45) Date of Patent: Oct. 23, 2018

(54) SYSTEMS AND METHODS FOR MAINTAINING OWNERSHIP OF AND AVOIDING ORPHANING OF COMMUNICATION SESSIONS

(71) Applicants: Allyn D Smith, Roseville, MN (US); Steven R Hallquist, Roseville, MN (US); William O Pollnow, Roseville, MN (US)

(72) Inventors: Allyn D Smith, Roseville, MN (US); Steven R Hallquist, Roseville, MN (US); William O Pollnow, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 289 days.

(21) Appl. No.: 14/823,424

(22) Filed: Aug. 11, 2015

(65) Prior Publication Data

US 2017/0048326 A1 Feb. 16, 2017

(51) Int. Cl.
*G06F 15/173* (2006.01)
*H04L 29/08* (2006.01)
*A63F 13/31* (2014.01)
*A63F 13/77* (2014.01)
*A63F 13/95* (2014.01)
*A63F 13/44* (2014.01)

(52) U.S. Cl.
CPC ........... *H04L 67/141* (2013.01); *A63F 13/31* (2014.09); *A63F 13/44* (2014.09); *A63F 13/77* (2014.09); *A63F 13/95* (2014.09); *H04L 67/10* (2013.01)

(58) Field of Classification Search
CPC ........ H04L 67/141; H04L 67/10; A63F 13/31; A63F 13/44; A63F 13/77; A63F 13/95
See application file for complete search history.

(56) References Cited

U.S. PATENT DOCUMENTS

| 5,027,269 A * | 6/1991 | Grant ................... G06F 11/142 |
| | | 709/224 |
| 6,748,420 B1 * | 6/2004 | Quatrano .......... G06F 17/30873 |
| | | 707/E17.111 |
| 6,941,487 B1 * | 9/2005 | Balakrishnan ........ H04W 24/04 |
| | | 370/216 |
| 7,266,595 B1 * | 9/2007 | Black .................. H04L 41/0806 |
| | | 709/223 |

(Continued)

*Primary Examiner* — Ario Etienne
*Assistant Examiner* — Blake J Rubin

(57) ABSTRACT

Systems and methods for improving the handing of communications between network applications in a computer system with connectivity services interfaces that seamlessly handle the communications in an easy-to-use, secure, message-oriented environment are disclosed. Embodiments of systems and methods for maintaining ownership of sessions by applications, and for avoiding the orphaning of communication sessions when activities are terminated are also disclosed. Also disclosed are embodiments of systems and methods for accessing data using authentication credentials different than the authentication credentials associated with a user that is requesting access to the data. Embodiments of systems and methods for authenticating credentials for establishing a secure communication connection between applications executing on different platforms are also disclosed.

12 Claims, 11 Drawing Sheets

(56) References Cited

U.S. PATENT DOCUMENTS

| | | | | |
|---|---|---|---|---|
| 7,293,107 B1* | 11/2007 | Hanson | H04W 8/02 | 455/432.1 |
| 7,792,902 B2* | 9/2010 | Chatani | A63F 13/45 | 463/42 |
| 7,929,443 B1* | 4/2011 | Anumala | H04L 47/724 | 370/235 |
| 9,128,965 B1* | 9/2015 | Yanacek | G06F 17/30292 | |
| 9,195,965 B2* | 11/2015 | Sitrick | G06Q 10/101 | |
| 9,712,421 B2* | 7/2017 | Dolson | H04L 43/12 | |
| 2002/0095584 A1* | 7/2002 | Royer | H04L 63/0428 | 713/183 |
| 2003/0120789 A1* | 6/2003 | Hepworth | H04L 29/06 | 709/230 |
| 2006/0059125 A1* | 3/2006 | Yan | H04L 67/14 | |
| 2008/0162704 A1* | 7/2008 | Poplett | H04L 67/142 | 709/228 |
| 2008/0271044 A1* | 10/2008 | Yordanov | G06F 8/60 | 718/108 |
| 2008/0276234 A1* | 11/2008 | Taylor | G06F 8/60 | 717/177 |
| 2009/0016504 A1* | 1/2009 | Mantell | H04L 51/066 | 379/101.01 |
| 2010/0332615 A1* | 12/2010 | Short | H04L 63/08 | 709/217 |
| 2011/0196914 A1* | 8/2011 | Tribbett | G06F 9/541 | 709/203 |
| 2011/0225230 A1* | 9/2011 | Russ | H04L 67/145 | 709/203 |
| 2011/0320544 A1* | 12/2011 | Yee | H04L 12/14 | 709/206 |
| 2012/0036257 A1* | 2/2012 | Mann | H04L 65/1066 | 709/224 |
| 2012/0057591 A1* | 3/2012 | Erman | H04L 63/0218 | 370/389 |
| 2012/0192261 A1* | 7/2012 | Blot-Levevre | G06Q 20/02 | 726/10 |
| 2013/0159374 A1* | 6/2013 | Steiner | H04L 51/16 | 709/201 |
| 2013/0179947 A1* | 7/2013 | Kline, III | H04L 67/28 | 726/4 |
| 2013/0242984 A1* | 9/2013 | Lee | H04L 49/15 | 370/386 |
| 2013/0311594 A1* | 11/2013 | Luna | H04L 43/065 | 709/213 |
| 2014/0079207 A1* | 3/2014 | Zhakov | H04M 3/5175 | 379/265.03 |
| 2014/0214956 A1* | 7/2014 | Huo | H04L 67/14 | 709/204 |
| 2014/0304499 A1* | 10/2014 | Gopinath | H04L 63/168 | 713/151 |
| 2014/0351370 A1* | 11/2014 | Ashley | H04L 67/148 | 709/217 |
| 2015/0350338 A1* | 12/2015 | Barnett | H04L 67/22 | 709/203 |
| 2016/0380861 A1* | 12/2016 | Ali | H04L 67/14 | 709/224 |
| 2017/0019485 A1* | 1/2017 | Dorr | H04L 67/142 | |

* cited by examiner

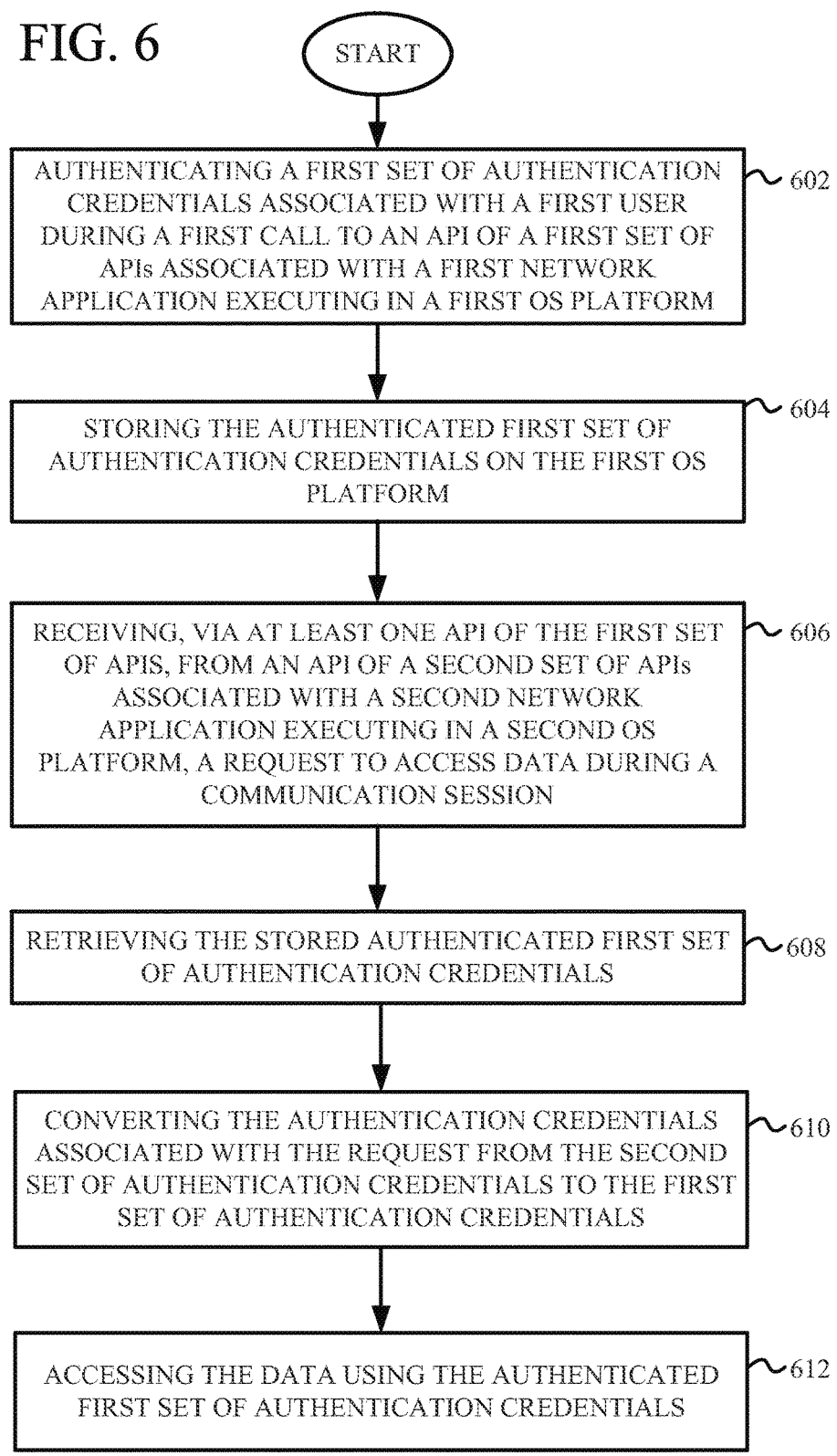

SYSTEMS AND METHODS FOR MAINTAINING OWNERSHIP OF AND AVOIDING ORPHANING OF COMMUNICATION SESSIONS

FIELD OF THE DISCLOSURE

The instant disclosure relates generally to computer systems. More specifically, this disclosure relates to the handling of communication between network applications in a computer system by connectivity services interfaces in the computer system.

BACKGROUND

Communication between network interfaces entails numerous issues. For example, when network applications execute on different operating system (OS) platforms, accessing services of a first OS platform via a first network application executing in the first OS platform from a second network application executing in a second OS platform can be a complex process that consumes a significant amount of time and computing resources and results in user frustration. In addition, some services, such as those requiring high levels of security or user authentication, may not be available from remote network applications. Current connectivity services tasked with handling the communication between network interfaces in computer systems suffer from the foregoing drawbacks and numerous others, thus making them less-than-optimal solutions for computer system consumers.

SUMMARY

The handling of communications between network applications in a computer system may be improved with connectivity services interfaces that seamlessly handle the communications in an easy-to-use, secure, message-oriented environment. According to one embodiment, a method for handling communications between network applications may include associating, by a processor, a first set of application interfaces (APIs) with a first network application executing in a first operating system (OS) platform. The method may also include receiving, by the processor, via at least one API of the first set of APIs, a message from an API of a second set of APIs associated with a second network application executing in a second OS platform. The method may further include packaging, by the processor, using at least one API of the first set of APIs, the received message, wherein packaging comprises converting the message from a format configured for use by the second network application on the second OS platform to a format for use by the first network application on the first OS platform. The method may also include processing, by the processor, the packaged message with the first network application on the first OS platform.

According to another embodiment, a computer program product may include a non-transitory computer-readable medium including instructions which, when executed by a processor of a computing system, cause the processor to perform the step of associating a first set of application interfaces (APIs) with a first network application executing in a first operating system (OS) platform. The medium may also include instructions which cause the processor to perform the step of receiving via at least one API of the first set of APIs, a message from an API of a second set of APIs associated with a second network application executing in a second OS platform. The medium may further include instructions which cause the processor to perform the step of packaging using at least one API of the first set of APIs, the received message, wherein packaging comprises converting the message from a format configured for use by the second network application on the second OS platform to a format for use by the first network application on the first OS platform. The medium may also include instructions which cause the processor to perform the step of processing the packaged message with the first network application on the first OS platform.

According to yet another embodiment, an apparatus may include a memory and a processor coupled to the memory. The processor may be configured to execute the step of associating a first set of application interfaces (APIs) with a first network application executing in a first operating system (OS) platform. The processor may also be configured to perform the step of receiving via at least one API of the first set of APIs, a message from an API of a second set of APIs associated with a second network application executing in a second OS platform. The processor may be further configured to perform the step of packaging using at least one API of the first set of APIs, the received message, wherein packaging comprises converting the message from a format configured for use by the second network application on the second OS platform to a format for use by the first network application on the first OS platform. The processor may also be configured to perform the step of processing the packaged message with the first network application on the first OS platform.

According to one embodiment, a method for maintaining ownership of sessions by applications may include obtaining, by a processor, a communication session table, wherein the communication session table comprises a data structure with information used to establish and maintain a communication session between network applications. The method may also include determining, by the processor, if an activity table exists, wherein an activity table comprises a list of operations scheduled for execution. The method may further include determining, by the processor, when an activity table is determined to exist, if the session table is linked to the activity table or to another activity table. The method may also include linking, by the processor, the session table to the activity table when the activity table is determined to exist, the session table is determined to not already be linked to the activity table, and the session table is referenced by the activity table. The method may further include performing, by the processor, a computer instruction requested by a user on the communication session identified in the session table when the activity table exists and the session table is linked to the activity table.

According to another embodiment, a computer program product may include a non-transitory computer-readable medium including instructions which, when executed by a processor of a computing system, cause the processor to perform the step of obtaining a communication session table, wherein the communication session table comprises a data structure with information used to establish and maintain a communication session between network applications. The medium may also include instructions which cause the processor to perform the step of determining if an activity table exists, wherein an activity table comprises a list of operations scheduled for execution. The medium may further include instructions which cause the processor to perform the step of determining when an activity table is determined to exist, if the session table is linked to the activity table or to another activity table. The medium may also include instructions which cause the processor to perform the step of linking the session table to the activity table when the activity table is determined to exist, the session table is determined to not already be linked to the activity table, and the session table is referenced by the activity table. The medium may also include instructions which cause the processor to perform the step of performing a computer instruction requested by a user on the communication session identified in the session table when the activity table exists and the session table is linked to the activity table.

According to yet another embodiment, an apparatus may include a memory and a processor coupled to the memory. The processor may be configured to execute the step of obtaining a communication session table, wherein the communication session table comprises a data structure with information used to establish and maintain a communication session between network applications. The processor may also be configured to perform the step of determining if an activity table exists, wherein an activity table comprises a list of operations scheduled for execution. The processor may be further configured to perform the step of determining when an activity table is determined to exist, if the session table is linked to the activity table or to another activity table. The processor may also be configured to perform the step of linking the session table to the activity table when the activity table is determined to exist, the session table is determined to not already be linked to the activity table, and the session table is referenced by the activity table. The processor may be further configured to perform the step of performing a computer instruction requested by a user on the communication session identified in the session table when the activity table exists and the session table is linked to the activity table.

According to one embodiment, a method for avoiding the orphaning of communication sessions when activities are terminated may include identifying, by the processor, one or more communication session tables linked to an activity table. The method may also include detecting, by the processor, termination of the activity table prior to the one or more session tables determined to be linked to the activity table being linked to other activity tables or being terminated. The method may further include determining, by the processor, whether a first session table of the one or more session tables determined to be linked to the terminated activity corresponds to a listen session or a standard communication session. The method may also include aborting the standard communication session, freeing resources allocated to the communication session, and removing the link between the first session table and the activity table when the first session table is determined to correspond a standard communication session.

According to another embodiment, a computer program product may include a non-transitory computer-readable medium including instructions which, when executed by a processor of a computing system, cause the processor to perform the step of identifying one or more communication session tables linked to an activity table. The medium may also include instructions which cause the processor to perform the step of detecting termination of the activity table prior to the one or more session tables determined to be linked to the activity table being linked to other activity tables or being terminated. The medium may further include instructions which cause the processor to perform the step of determining whether a first session table of the one or more session tables determined to be linked to the terminated activity corresponds to a listen session or a standard communication session. The medium may also include instructions which cause the processor to perform the step of aborting the standard communication session, freeing resources allocated to the communication session, and removing the link between the first session table and the activity table when the first session table is determined to correspond a standard communication session.

According to yet another embodiment, an apparatus may include a memory and a processor coupled to the memory. The processor may be configured to execute the step of identifying one or more communication session tables linked to an activity table. The processor may also be configured to perform the step of detecting termination of the activity table prior to the one or more session tables determined to be linked to the activity table being linked to other activity tables or being terminated. The processor may be further configured to perform the step of determining whether a first session table of the one or more session tables determined to be linked to the terminated activity corresponds to a listen session or a standard communication session. The processor may also be configured to perform the step of aborting the standard communication session, freeing resources allocated to the communication session, and removing the link between the first session table and the activity table when the first session table is determined to correspond a standard communication session.

According to one embodiment, a method for accessing data using authentication credentials different than the authentication credentials associated with a user that is requesting access to the data may include authenticating, by a processor, a first set of authentication credentials associated with a first user during a first call to an application interface (API) of a first set of APIs associated with a first network application executing in a first operating system (OS) platform. The method may also include storing, by the processor, the authenticated first set of authentication credentials on the first OS platform. The method may further include receiving, by the processor, via at least one API of the first set of APIs, from an API of a second set of APIs associated with a second network application executing in a second OS platform, a request to access data during a communication session, wherein a second set of authentication credentials associated with a second user are associated with the received request. The method may also include retrieving, by the processor, the stored authenticated first set of authentication credentials. The method may further include converting, by the processor, the authentication credentials associated with the request from the second set of authentication credentials to the first set of authentication credentials. The method may also include accessing, by the processor, the data using the authenticated first set of authentication credentials.

According to another embodiment, a computer program product may include a non-transitory computer-readable medium including instructions which, when executed by a processor of a computing system, cause the processor to perform the step of authenticating a first set of authentication credentials associated with a first user during a first call to an application interface (API) of a first set of APIs associated with a first network application executing in a first operating system (OS) platform. The medium may also include instructions which cause the processor to perform the step of storing the authenticated first set of authentication credentials on the first OS platform. The medium may further include instructions which cause the processor to perform the step of receiving via at least one API of the first set of APIs, from an API of a second set of APIs associated with a second network application executing in a second OS platform, a request to access data during a communication session, wherein a second set of authentication credentials associated with a second user are associated with the received request. The medium may also include instructions which cause the processor to perform the step of retrieving the stored authenticated first set of authentication credentials. The medium may further include instructions which cause the processor to perform the step of converting the authentication credentials associated with the request from the second set of authentication credentials to the first set of authentication credentials. The medium may also include instructions which cause the processor to perform the step of accessing the data using the authenticated first set of authentication credentials.

According to yet another embodiment, an apparatus may include a memory and a processor coupled to the memory. The processor may be configured to execute the step of authenticating a first set of authentication credentials associated with a first user during a first call to an application interface (API) of a first set of APIs associated with a first network application executing in a first operating system (OS) platform. The processor may also be configured to perform the step of storing the authenticated first set of authentication credentials on the first OS platform. The processor may be further configured to perform the step of receiving via at least one API of the first set of APIs, from an API of a second set of APIs associated with a second network application executing in a second OS platform, a request to access data during a communication session, wherein a second set of authentication credentials associated with a second user are associated with the received request. The processor may also be configured to perform the step of retrieving the stored authenticated first set of authentication credentials. The processor may be further configured to perform the step of converting the authentication credentials associated with the request from the second set of authentication credentials to the first set of authentication credentials. The processor may also be configured to perform the step of accessing the data using the authenticated first set of authentication credentials.

According to one embodiment, a method for authenticating credentials for establishing a secure communication connection between applications executing on different platforms may include receiving, by a processor, a first set of authentication credentials, wherein the first set of authentication credentials comprise credentials for accessing data on a first operation system (OS) platform, and wherein the first set of authentication credentials comprise either an encrypted user identification (ID) and password or first packaged data generated by a first interface executing on a second OS platform. The method may also include selecting, by the processor, a first authentication process from at least two authentication processes to process the first set of authentication credentials when the received first set of authentication credentials comprises an encrypted user ID and password. Processing, by the processor, the first set of authentication credentials in accordance with the selected first authentication process may include: decrypting the encrypted user ID and password; authenticating the decrypted user ID and password with an authentication and session initiation subsystem (ASIS) executing on the first OS platform; and storing the authenticated user ID.

According to another embodiment, a computer program product may include a non-transitory computer-readable medium including instructions which, when executed by a processor of a computing system, cause the processor to perform the step of receiving a first set of authentication credentials, wherein the first set of authentication credentials comprise credentials for accessing data on a first operation system (OS) platform, and wherein the first set of authentication credentials comprise either an encrypted user identification (ID) and password or first packaged data generated by a first interface executing on a second OS platform. The medium may also include instructions which cause the processor to perform the step of selecting a first authentication process from at least two authentication processes to process the first set of authentication credentials when the received first set of authentication credentials comprises an encrypted user ID and password, wherein processing the first set of authentication credentials in accordance with the selected first authentication process includes: decrypting the encrypted user ID and password; authenticating the decrypted user ID and password with an authentication and session initiation subsystem (ASIS) executing on the first OS platform; and storing the authenticated user ID.

According to yet another embodiment, an apparatus may include a memory and a processor coupled to the memory. The processor may be configured to execute the step of receiving a first set of authentication credentials, wherein the first set of authentication credentials comprise credentials for accessing data on a first operation system (OS) platform, and wherein the first set of authentication credentials comprise either an encrypted user identification (ID) and password or first packaged data generated by a first interface executing on a second OS platform. The processor may also be configured to perform the step of selecting a first authentication process from at least two authentication processes to process the first set of authentication credentials when the received first set of authentication credentials comprises an encrypted user ID and password, wherein processing the first set of authentication credentials in accordance with the selected first authentication process includes: decrypting the encrypted user ID and password; authenticating the decrypted user ID and password with an authentication and session initiation subsystem (ASIS) executing on the first OS platform; and storing the authenticated user ID.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 6 is a flow chart illustrating a method for accessing data using authentication credentials different than the authentication credentials associated with a user that is requesting access to the data according to one embodiment of the disclosure.

DETAILED DESCRIPTION

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
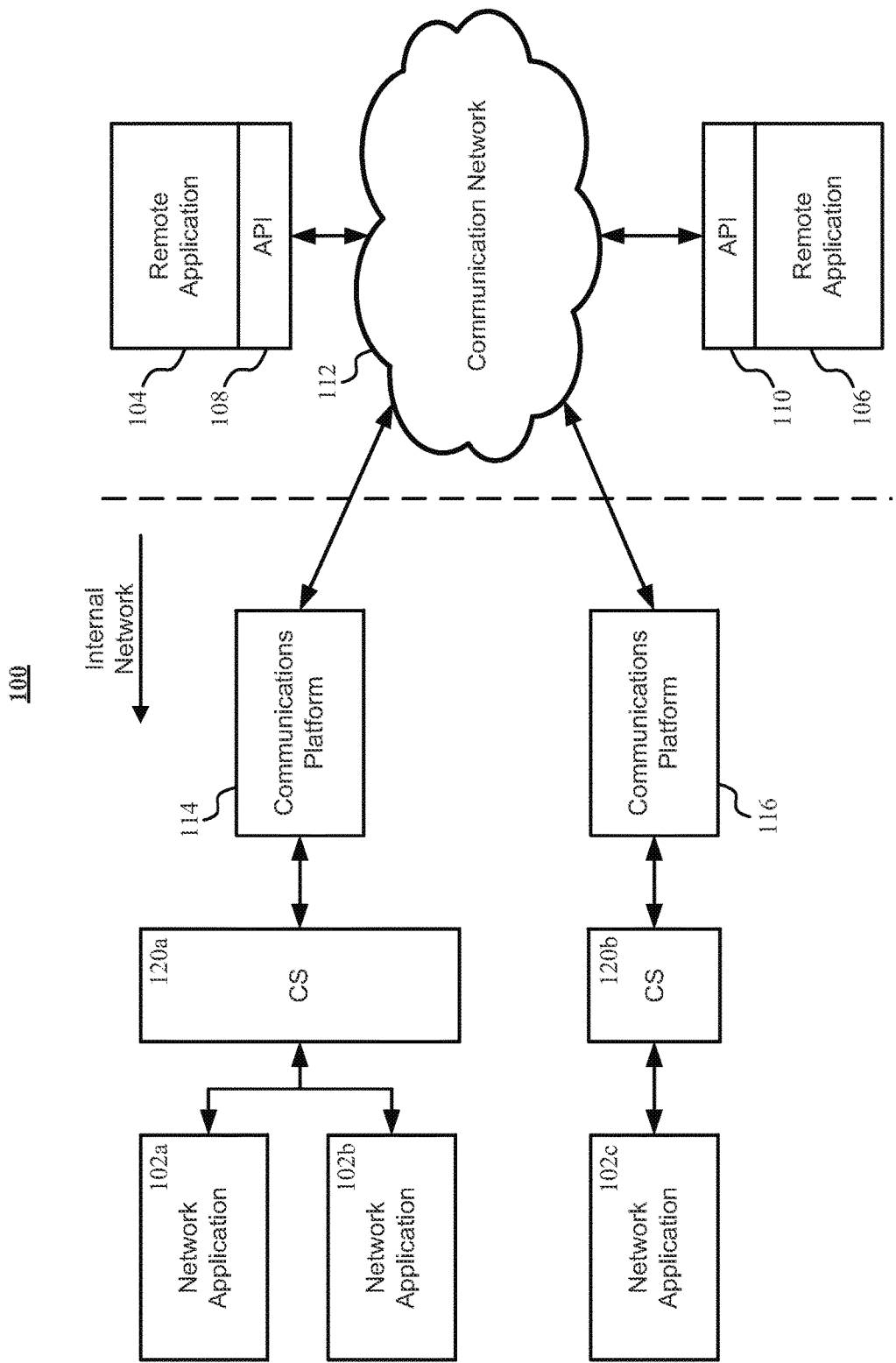
FIG. 1 is a schematic block diagram illustrating a computing system including connectivity services (CS) interfaces that handle communications between network applications according to one embodiment of the disclosure.

FIG. 1 is a schematic block diagram illustrating a computing system including CSs that handle communications between network applications according to one embodiment of the disclosure. The computing system 100 includes network applications 102a-102c executing in a first OS platform, remote network applications 104 and 106. APIs 108 and 110, a communication network 112, communications platforms 114 and 116, and CSs 120a-120b. A network application executing in an OS platform may include a network application executing on a computer managed by the OS or a network application executing on a server managed by the OS or both. Accordingly, in one embodiment, network application 102a may execute on a computer managed by a specific OS, network application 102b may execute on a server managed by the OS, and network application 102c may execute on a combination of computers and server managed by the OS.

A remote application 104 or 106 may refer to a network application executing outside an internal computing network. For example, as shown in the embodiment of FIG. 1, the network applications 102a-102c may execute on computing systems within the internal network, while remote applications 104 and 106 may execute on computing system not within the internal network. In some embodiments, remote applications 104 and 106 may be located at geographic locations different than the geographic location of one or more of the network applications 102a-102c. For example, in another embodiment, one or more of the remote applications 104 and 106 may execute in the same OS platform as network applications 102a-102c, but on different computing systems than those on which the network applications 102a-102c execute, such as computing systems outside the internal network and/or computing systems located at geographically different locations than the computing systems on which the network applications 102a-102c execute. In another embodiment, a remote application 104 or 106 may refer to a network application managed by an OS platform different than the OS platform managing the network applications 102a-102c but geographically located at the same location as the network applications 102a-102c and/or within the internal network in which the network applications 102a-102c execute.

As shown in the embodiment of FIG. 1, communication between remote network applications 104 and 106 and a network application 102a-102c may be effectuated via numerous components. For example, remote applications 104 and 106 may be associated with application interfaces (APIs) 108 and 110 that enable the remote applications 104 and 106 to access a communication network 112 through which the remote applications 104 and 106 may communicate with network applications 102a-102c. An API 108 or 110 may be a combination of hardware and/or software configured to implement the functions that effectuate communication between a network application, whether local or remote, and other components of the computer system 100. In some embodiments, an API 108 or 110 may also include remote calls which may be called (executed) to cause one or more subroutines or procedures to execute in an address space.

The communication network 112 may facilitate communications of data between the network applications, such as between remote network applications 104 and 106 and network applications 102a-102c. The communication network 112 may include any type of communications network, such as a direct PC-to-PC connection, a local area network (LAN), a wide area network (WAN), a modem-to-modem connection, the Internet, a combination of the above, or any other communications network now known or later developed within the networking arts which permits two or more computers to communicate.

The Communications Platforms 114 and 116 may include a combination of hardware and/or software configured to connect network application programs, such as network applications 102a-102c with terminals, workstations, and other applications in a data communications network, such as remote applications 104 and 106. For example, some of the functionality which a communications platform may provide includes implementation of communication protocol stacks. In some embodiments, the communications platforms 114 and 116 may include network interface cards (NICs) to effectuate access to the communication network 112. The communications platforms 114 and 116 may also be configured to support open communication standards. Accordingly, network applications 102a-102c may access the communications platform 114 or 116 to connect to the network and ultimately communicate with remote applications 104 or 106.

The computing system 100 also includes CSs 120a-102b that handle the communications between the network applications 102a-102c and network applications 104 and 106. In other words, a CS may serve as the interface between a network application executing in one OS platform and a network application executing in another OS platform. In some embodiments, CSs 120a-120c may, on behalf of a network application 102a-102c, provide message-oriented communication, authentication of remote users, security, and impersonation of an authenticated user wherein a network application 102a-102c may be granted access to data assets associated with the authenticated user being impersonated. Security for a CS may be provided in various ways, such as by encryption and decryption of data in transit, i.e., being transferred, and/or by way of "hacker frustration" in which only a limited number of invalid remote connect attempts are allowed from a specific remote location before denying access to CS from that remote location for a period of time. In one embodiment, access may be denied by a CS 120a-120b until an administrator overrides the denial and allows access.

In some embodiments, a network application 102a-102c may initiate CS interaction by sending a message to a CS 120 requesting communication with a remote application 104 or 106, such as for the transfer of data to and from a remote application 104 or 106 and the network application 102a-102c. The CS 120 may receive the message, package it into a proper message format, and then call a communications platform 114 or 116 to send the message to its destination. In another embodiment, a CS 120 may receive a message from the network, package the message, and then transfer the message to the appropriate network application 102a-102c.

In some embodiments, CSs 120a-120b may provide a message-oriented service by packaging application data within a CS protocol frame. For example, the CSs 120a-120b may send data as a CS protocol frame through a communications platform 114 or 116. In one embodiment, when receiving data from remote applications 104 or 106, a CS 120 may receive a message, reassemble a CS protocol frame, and then pass the data from the frame to a receiving application as a pointer to a queue bank. By sending the data as a pointer to a queue bank, a CS 120 may avoid creating data copies in user memory when sending the data.

According to another embodiment, the CSs 120a-120b may provide authentication services through standard Industry logon procedures. The CSs 120a-120b may also provide secure data transmission, such as, for example, providing SSL/TLS services for data in transit.

The CSs 120a-120b may be configured to perform many functions, but in some embodiments the CSs 120a-120b may perform a handful of functions more than others. One such function is a main logging function which may load the CS, a fixed gate shared subsystem (FGSS), initialize subsystem data, and identify subordinating functions to perform. The main logging function may also handle all logging requests from the CS 120. The CSs 120a-120b may also be configured to perform keyin/user-command functions, which may include the handling of commands to the CS 120. The CSs 120a-120b may also be configured to perform timing functions, such as for managing a timer for timed events. The CSs 120a-120b may be further configured to perform communications input receive activity to handle inputs from the communications platforms 114 or 116. In addition, the CSs 120a-120b may be configured to perform master functions, which may include the handling of authentication processing.

In some embodiments, a remote network application 104 or 106 may operate under the same OS platform and/or perform similar functions as a network application 102. In addition, in some embodiments a remote network application 104 or 106 may interact with other network applications in a similar manner that a network application 102 interacts with other network applications. For example, an API 108 or 110 may include a CS and/or a communications platform so as to handle communication to and from a remote application in the same manner that CS 120 and communications platform 114 or 116 handles communication to and from network applications 102.

Figure 2:
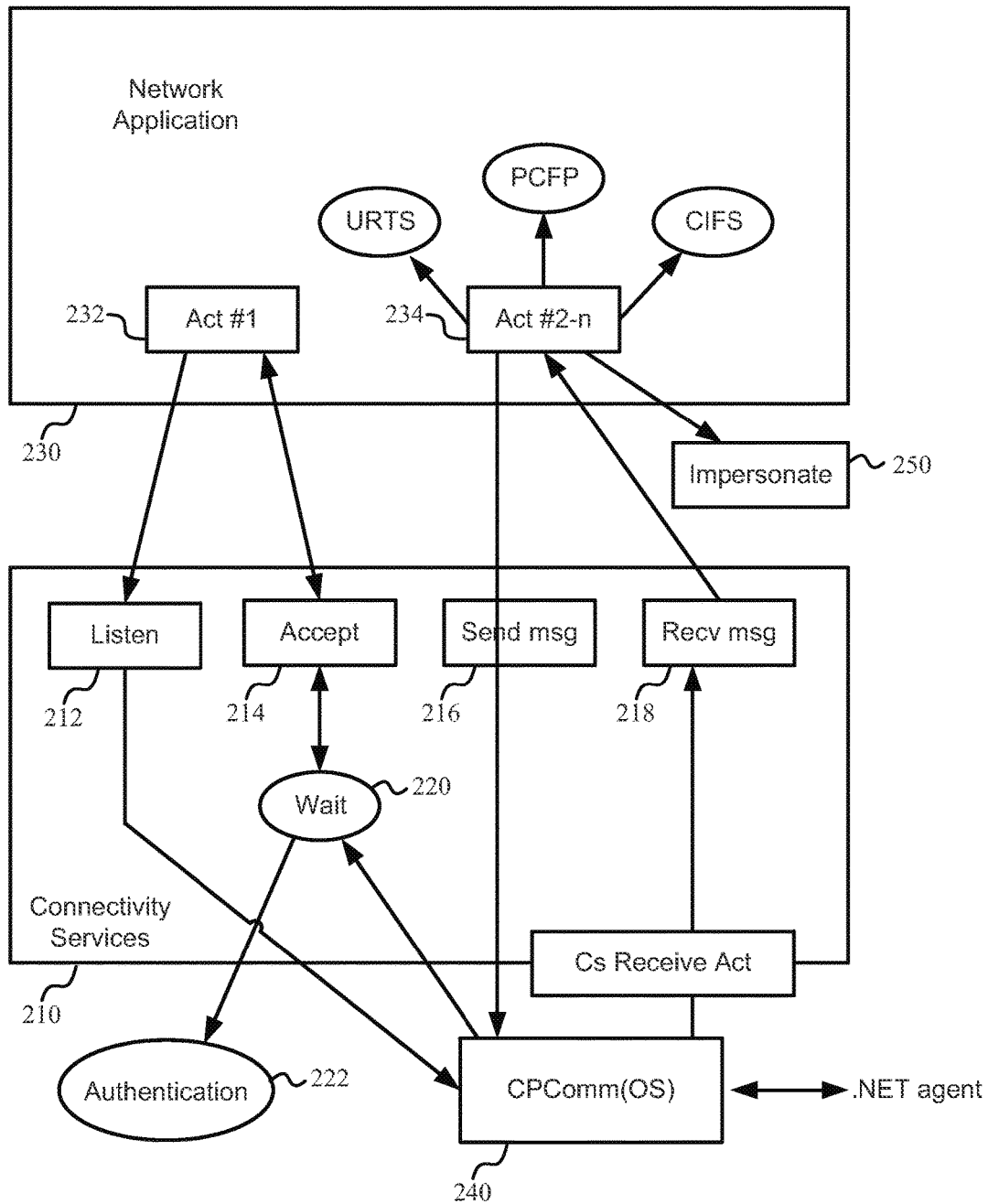
FIG. 2 is a schematic block diagram illustrating interaction between a network application and connectivity services interfaces according to one embodiment of the disclosure.

FIG. 2 is a schematic block diagram illustrating interaction between a network application and connectivity services interfaces according to one embodiment of the disclosure. As illustrated in the embodiment of FIG. 2, a CS 210 may include a Listen interface 212, an Accept interface 214, a Send interface 216, and a Receive interface 218. The interfaces illustrated in FIG. 2 are not exhaustive of the countless interfaces provided within a CS, thus the interfaces illustrated in FIG. 2 serve as a subset of the interfaces available within a CS.

The interfaces provided within a CS 210 may serve as the entry points through which a network application, such as network application 230, accesses the CS 210. In particular, network application 230 may access CS 210 by calling an interface provided by CS 210. When network application 230 calls an interface of CS 210, the parameters used for each procedure requested to be executed may be presented to the computing system on which the network application 230 and CS 210 execute in the same order in which the parameters appear in the call to the interface of CS 210. In some embodiments, the network application 230 may pass pointers to the parameters to the CS 210, and the CS 210 may return values to the network application 230 based on use of the pointers.

In some embodiments, the first parameter passed by a network application 230 to an interface of the CS 210 may be pointer to a data packet, which may be a data structure through which a calling program of the network application 230 specifies most options that apply to the functions of the interface being called. According to an embodiment, the data packet may serve as both an input parameter and an output parameter. For example, in one embodiment, the data packet may include data used as input by a CS 210 or network application 230. In another embodiment, the data packet may include data output by a CS 210 or network application 230.

In the embodiment of FIG. 2, the first action 232 the network application 230 may take to begin utilization of the CS 210 is to call a Listen interface 212 of the CS 210. When the CS 210 receives the call to the Listen interface 212, the CS 210 may register an activity table associated with the call to the Listen interface 212 if the activity table has not already been registered. In some embodiments, if the subroutines associated with Listen interface 212 execute successfully, then the CS 210 and a communications platform 240 may be ready to receive inbound network connection requests on behalf of the network application 210. If the subroutines associated with the Listen interface 212 do not execute successfully, then the CS 210 may return a fail status to the network application 230. In response to the call to the Listen interface 212, the CS 210 may return to the network application 230 an identifier which identifies the remote network application seeking communication with the network application 230.

When the CS 210 receives a message from the communications platform 240 indicating a request from a remote network application for a communication connection with the network application 230, the CS 210 may create a session table for that connection so that subsequent input events and network application requests from the remote network application may be directed to the appropriate communications platform 240 and network application 210 communication session. In some embodiments, a session table may store the state of a connection, information specifying whether or not the connection implements certain security measures, information specifying whether the connection is a message-oriented connection or a byte-stream oriented connection, and generally any information which can be used to establish a communication session between network applications. In some embodiments, a session table identifier may be passed to the network application 230 in response to a call by the network application 230 to the Accept interface 214 of the CS 210.

According to an embodiment, when a session table has been created, the CS 210 may enter a Wait state 220 until authentication credentials are received from a remote network application via the communications platform 240. When the credentials are received, the CS 210 may initiate an authentication process 222. In some embodiments, the authentication process 222 may be initiated based on an authentication type specified in the received connection data frame. In one embodiment, if the exchange of the connect frame or the authentication fails, the CS 210 may abort the connection and release an associated session table.

Authentication processing performed by a computing system via an authentication module 222 may vary based on the type of authentication credentials provided. For example, in one embodiment, the credentials passed by the remote network application may be a user identification (ID) and password used for accessing data assets on an OS platform on which the network application 230 executes. In another embodiment, the credentials may be a user identification (ID) and password used for accessing data assets on an OS platform on which the remote network application 230 executes.

In some embodiments, after the network application 230 has called a Listen interface 212 of a CS 210 and the Listen interface 212 functions execute successfully, the network application 230 may call an Accept Interface 214. As illustrated in the embodiment of FIG. 2, the call to the Accept interface 214 may be part of a first action 232 performed by the network application 230. In another embodiment, the call may be a separate action. After the Accept interface 214 has been called, the CS 210 may enter a Wait state 220. In some embodiments, the CS 210 may stay in the Wait state 220 until it receives a communication from a remote network application via the communications platform 240 requesting communication with the network application 230. In some embodiments, the CS 210 may remain in the Wait state 220 even after receiving a communication request from a remote network application until the authentication credentials provided with the communication request are authenticated via the authentication processing module 222. After the Accept interface 214 has been called, the CS may return to the network application 230 a session ID, a security handle, and/or a user ID.

In some embodiments, the network application 230 may call the Send interface 216 to send data to a remote network application. In one embodiment, the data may be sent using a queue bank. According to an embodiment, the data may be included as part of a single message between the network application 230 and the remote network application, and the CS 210 may convert the message request into a send data request sent to the communications platform 240 which may then send the message to the receiving remote network application. In some embodiments, the network application 230 may call the Receive interface 218 to obtain data from the remote network application.

In some embodiments, the CS 210 may also include an Impersonate interface 250. For example, in some embodiments, after the functions associated with an Accept interface 214 have executed successfully, the network application 230 may change the authentication credentials associated with operations being initiated or executed by the network application 230 on the first OS platform. In some embodiments, the user currently accessing the network application 230 may be different than the user that initiated the call to the Accept interface 214, but the network application 230 may need the authentication credentials associated with the user that initiated the call to the Accept interface 214 to perform some operations on the OS platform on which it executes. By issuing a call to the Impersonate interface 250, the network application 230 may cause the CS 210 to switch the authentication credentials from the current user accessing the network application 230 from the remote network application to the authentication credentials associated with the original user that initiated the call to the Accept interface 214. In some embodiments, the original user's authentication credentials may have been stored in memory associated with the computing system on which the CS 210 and the network application 230 execute, and therefore the original user's authentication credentials may be retrieved from the location in memory. In other words, the authentication process may not need to be replicated to switch between authentication credentials after the authentication credentials have already been authenticated.

In some embodiments, after the network application 230 has finished performing operations that require the original user's authentication credentials, the network application 230 may call another interface, such as an End Impersonate interface (not shown), to return the authentication credentials associated with operations executed by the network application 230 from the original user's authentication credentials (the user that initiated the call to the Accept interface 214) to the authentication credentials associated with the user currently accessing the network application 230 from a remote application.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein.

Figure 3:
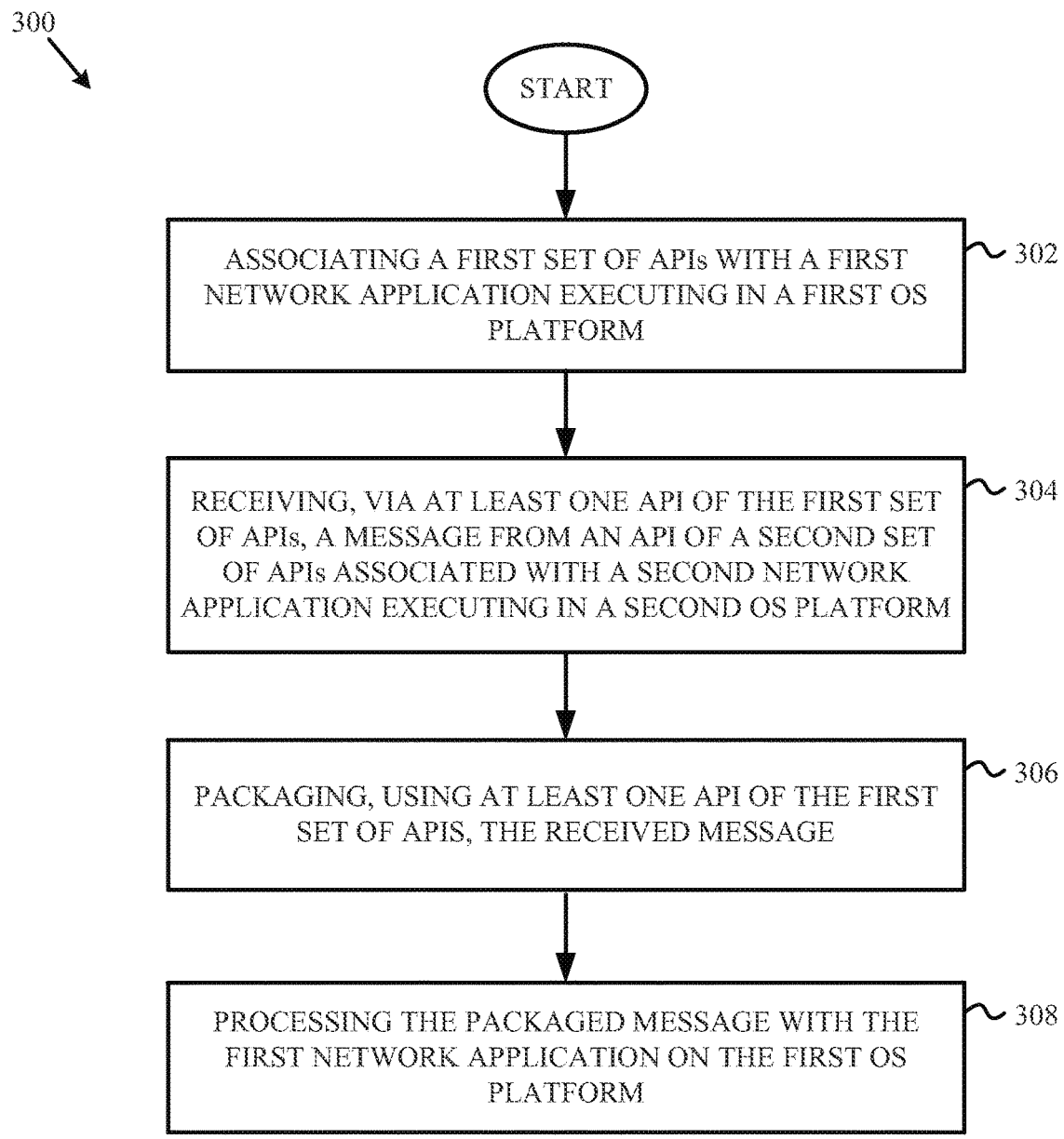
FIG. 3 is a flow chart illustrating a method for handling communications between network applications according to one embodiment of the disclosure.

FIG. 3 is a flow chart illustrating a method for handling communications between network applications according to one embodiment of the disclosure. It is noted that embodiments of method 300 may be implemented in accordance with the systems and embodiments described herein with respect to FIGS. 1-2 and FIG. 8. For example, embodiments of method 300 may be implemented by a computing system that includes at least a network application, a CS, and a communications platform as illustrated in FIGS. 1-2. In some embodiments, the computing system may be a processor, a server, or a combination of processors and servers, such as a network of processors and servers, and may include one or more components illustrated in FIGS. 1-2 and FIG. 8. In general, embodiments of method 300 may be implemented by other similar systems without deviating from this disclosure so long as the systems, whether directly or indirectly, support the operations as described herein.

Specifically, method 300 includes, at block 302, associating, by a processor, a first set of APIs with a first network application executing in a first OS platform. In some embodiments, the first set of APIs associated with the first network application may include a CS, such as, for example, CS 120 illustrated in FIG. 1 or CS 210 illustrated in FIG. 2. According to some embodiments, associating the first set of APIs with a first network application may include calling a first API of the first set of APIs to establish a relationship between the first set of APIs and the first network application and to indicate to a communications platform that the first set of APIs are ready to process inbound network connection requests for the first network application. For example, in one embodiment, a computing system may call a Listen interface of a CS, such as Listen interface 212 of CS 210 illustrated in FIG. 2, to establish a relationship between the first set of APIs and the first network application and to indicate to a communications platform that the first set of APIs are ready to process inbound network connection requests for the first network application.

At block 304, method 300 includes receiving, by the processor, via at least one API of the first set of APIs, a message from an API of a second set of APIs associated with a second network application executing in a second OS platform. For example, an API of a CS may receive a message from an API of a set of APIs associated with a remote application. In some embodiments, the received message may include at least one instruction to be processed by the first network application executing on the first OS platform. For example, in one embodiment, the instruction may be an instruction specifying a particular data asset to be retrieved from a computing system managed by the first OS platform. According to certain embodiments, the at least one instruction may have been input by a user using at least one API associated with the second network application executing on the second OS platform, such as a user interface.

Method 300 includes, at block 306, packaging, by the processor, using at least one API of the first set of APIs, the received message, wherein packaging includes converting the message from a format configured for use by the second network application on the second OS platform to a format for use by the first network application on the first OS platform. At block 308, method 300 includes processing, by the processor, the packaged message with the first network application on the first OS platform. For example, as noted with respect to the embodiment of FIG. 1, a CS 120 may receive a message from the network, such as from a remote network application, package the message, and then transfer the message to the appropriate network application 102a-102c for processing.

In another embodiment, the processor implementing the CS functions may package, using at least one API of the first set of APIs, data on the first OS platform obtained with the first network application, wherein packaging includes converting the data from a format configured for use by the first network application on the first OS platform to a format for use by the second network application on the second OS platform. After packaging the message, the processor may transmit the packaged data from the first OS platform to the second network application. For example, as noted with respect to the embodiment of FIG. 1, a CS 120 may receive a message from a network application 102a-102c, package it into a proper message format, and then call a communications platform 114 or 116 to send the message to its destination.

In some embodiments, a first OS platform may be the same as a second OS platform. In other embodiments, a first OS platform may be different than a second OS platform. According to some embodiments, OS platforms may include OS 2200 OS Platforms, Microsoft Windows OS Platforms, OS X OS Platforms, a combination of the above, or any other OS Platform now known or later developed within the operating system arts.

Figure 4:
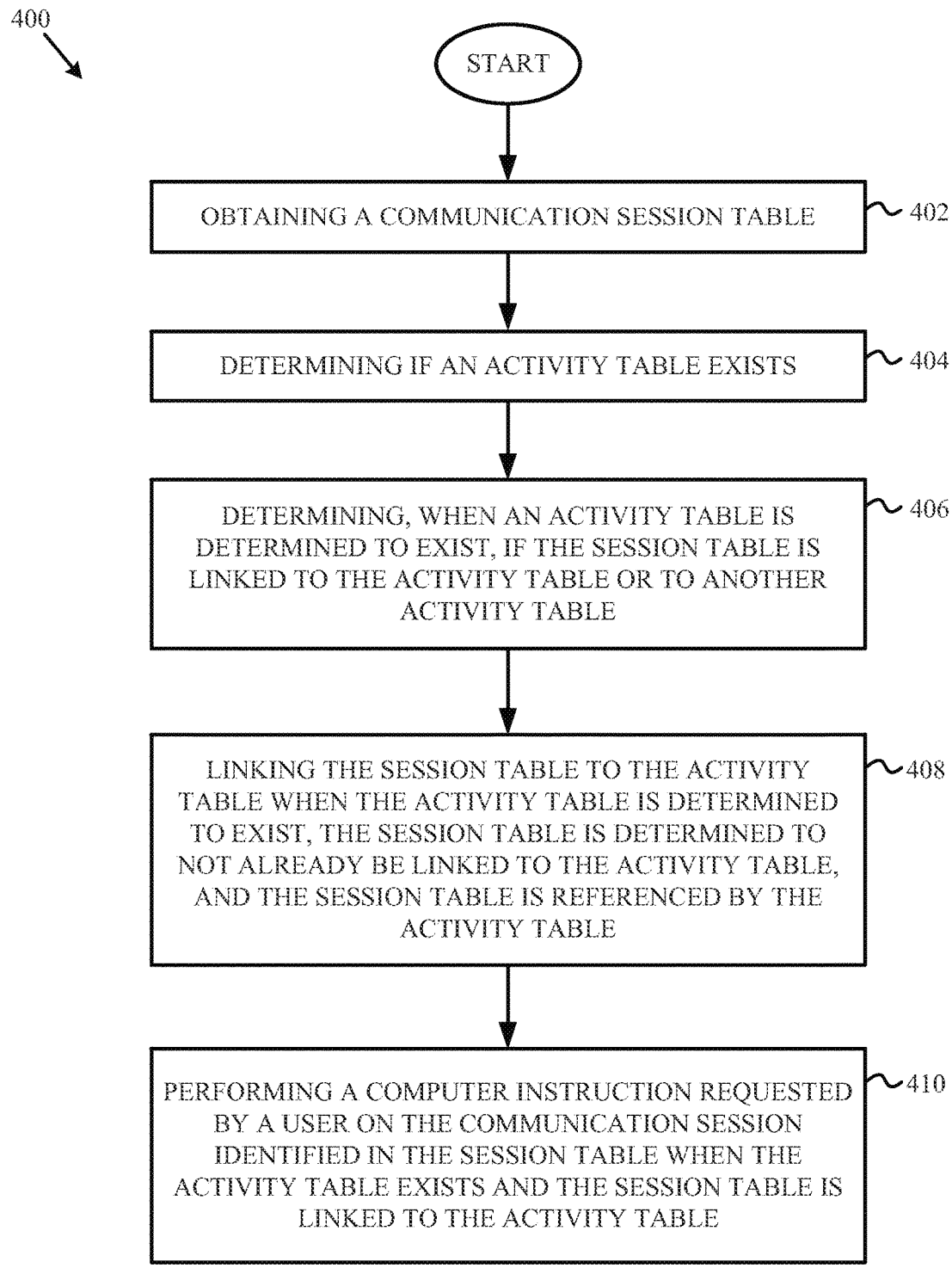
FIG. 4 is a flow chart illustrating a method for maintaining ownership of sessions by applications according to one embodiment of the disclosure.

FIG. 4 is a flow chart illustrating a method for maintaining ownership of sessions by applications according to one embodiment of the disclosure. It is noted that embodiments of method 400 may be implemented in accordance with the systems and embodiments described herein with respect to FIGS. 1-2 and FIG. 8. For example, embodiments of method 400 may be implemented by a computing system that includes at least a network application, a CS, and a communications platform as illustrated in FIGS. 1-2. In some embodiments, the computing system may be a processor, a server, or a combination of processors and servers, such as a network of processors and servers, and may include one or more components illustrated in FIGS. 1-2 and FIG. 8. In general, embodiments of method 400 may be implemented by other similar systems without deviating from this disclosure so long as the systems, whether directly or indirectly, support the operations as described herein.

Specifically, method 400 includes, at block 402, obtaining, by a processor, such as a processor on which a CS operates, a communication session table, wherein the communication session table may include a data structure with information used to establish and maintain a communication session between network applications. In some embodiments, obtaining a communication session table may include receiving a request to establish a communication session, wherein the request includes the session table. In another embodiment, obtaining a communication session table may include creating the session table, such as when a CS receives a message from the communications platform indicating a request from a remote network application for a communication connection with a network application.

Method 400 includes, at block 404, determining, by the processor, if an activity table exists. In some embodiments, an activity table, which may also be referred to as an execution thread, may include a list of operations or instructions scheduled for execution on a computing system. When an activity table is determined to not exist, the processor executing the CS may create an activity table. In some embodiments, when an activity table is created, the created activity table may also be registered for termination notification so that the activity table can be terminated when a determination is made by the computing system on which the CS executes that the activity table should be terminated.

At block 406, method 400 includes determining, by the processor, when an activity table is determined to exist, if the session table is linked to the activity table or to another activity table. In other words, when an activity table is determined to exist, either because the activity table was already pre-existing or because the activity table was recently created, a determination may be made as to whether or not the obtained session table is linked (i.e., assigned) to the activity table or to another activity table.

Method 400 includes, at block 408, linking, by the processor, the session table to the activity table when the activity table is determined to exist, the session table is determined to not already be linked to the activity table, and/or the session table is referenced by the activity table. When the session table is determined to be linked to another activity table, the processor within the computing system on which the CS executes may proceed to execute operations to link the session table to the activity table instead of the other activity table to which it is currently linked. For example, in some embodiments, when the session table is determined to be linked to another activity table, a processor may be configured to perform the steps of stopping an un-owned session timer associated with the session table if one exists, removing the link between the session table and the other activity table, and linking the session table to the activity table. In some embodiments, when the session table is determined to not be linked to an activity table, the computing system may start an un-owned session timer. When the timer expires, the session may be aborted if the session is valid, and no action may be taken if the session is not valid. At block 410, method 400 includes performing, by the processor, a computer instruction requested by a user on the communication session identified in the session table when the activity table exists and the session table is linked to the activity table.

Figure 4B:
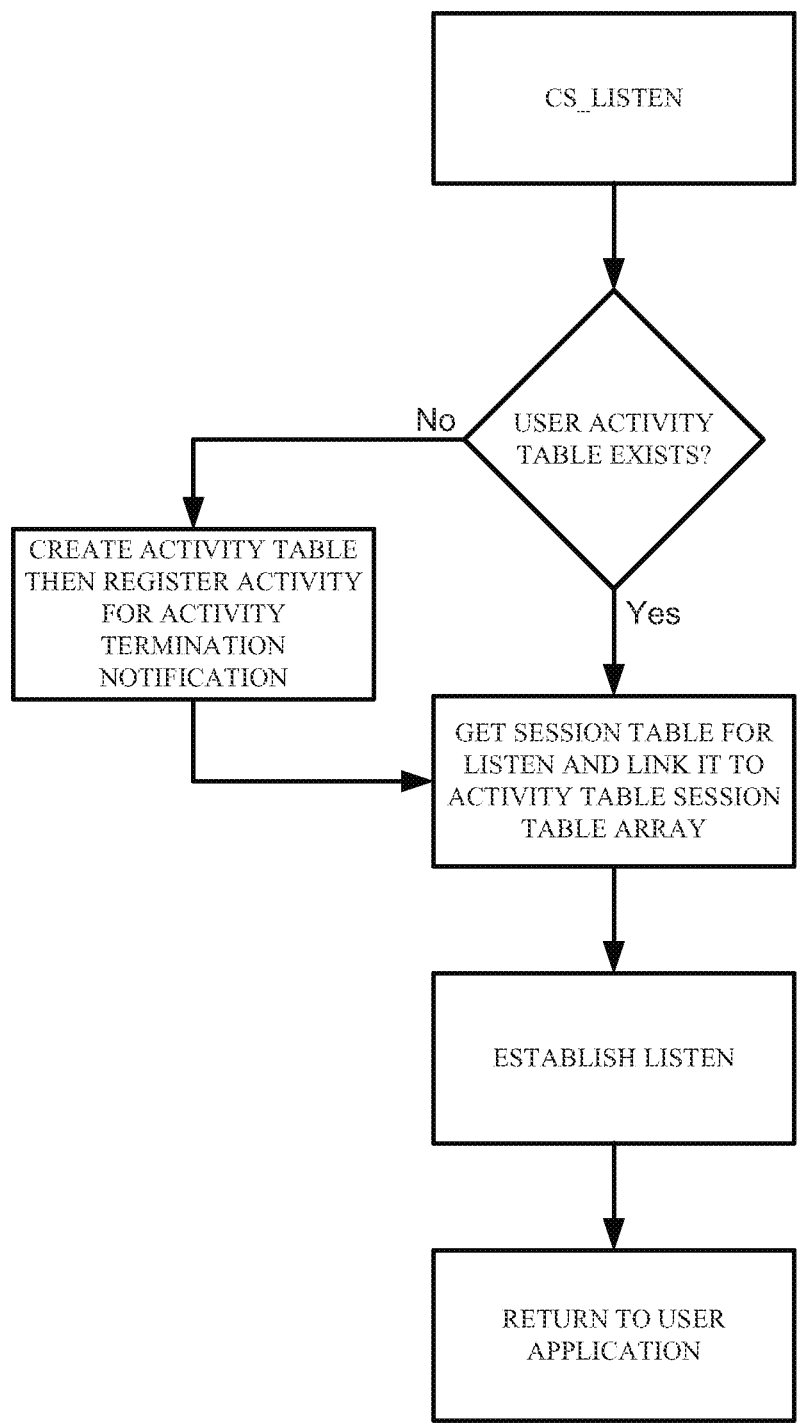
FIG. 4B is a flow chart illustrating process flows which may be implemented as part of a method for maintaining ownership of sessions by applications according to one embodiment of the disclosure.
Figure 4C:
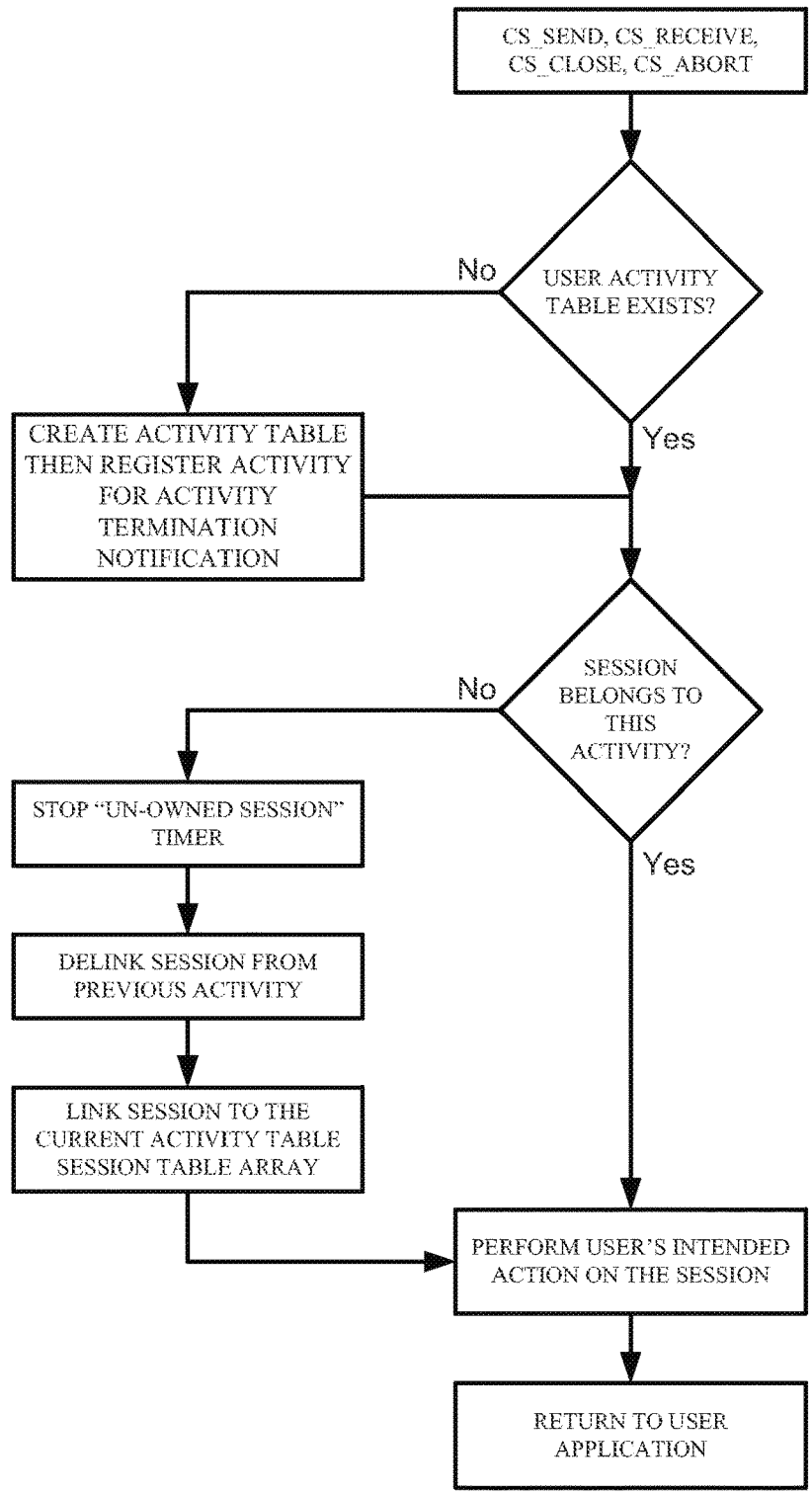
FIG. 4C is another flow chart illustrating process flows which may be implemented as part of a method for maintaining ownership of sessions by applications according to one embodiment of the disclosure.

FIGS. 4B and 4C provide illustrations of embodiments of the method disclosed in FIG. 4. In particular, FIG. 4B is a flow chart illustrating process flows which may be implemented as part of a method for maintaining ownership of sessions by applications according to one embodiment of the disclosure, and FIG. 4C is another flow chart illustrating process flows which may be implemented as part of a method for maintaining ownership of sessions by applications according to one embodiment of the disclosure.

Figure 5:
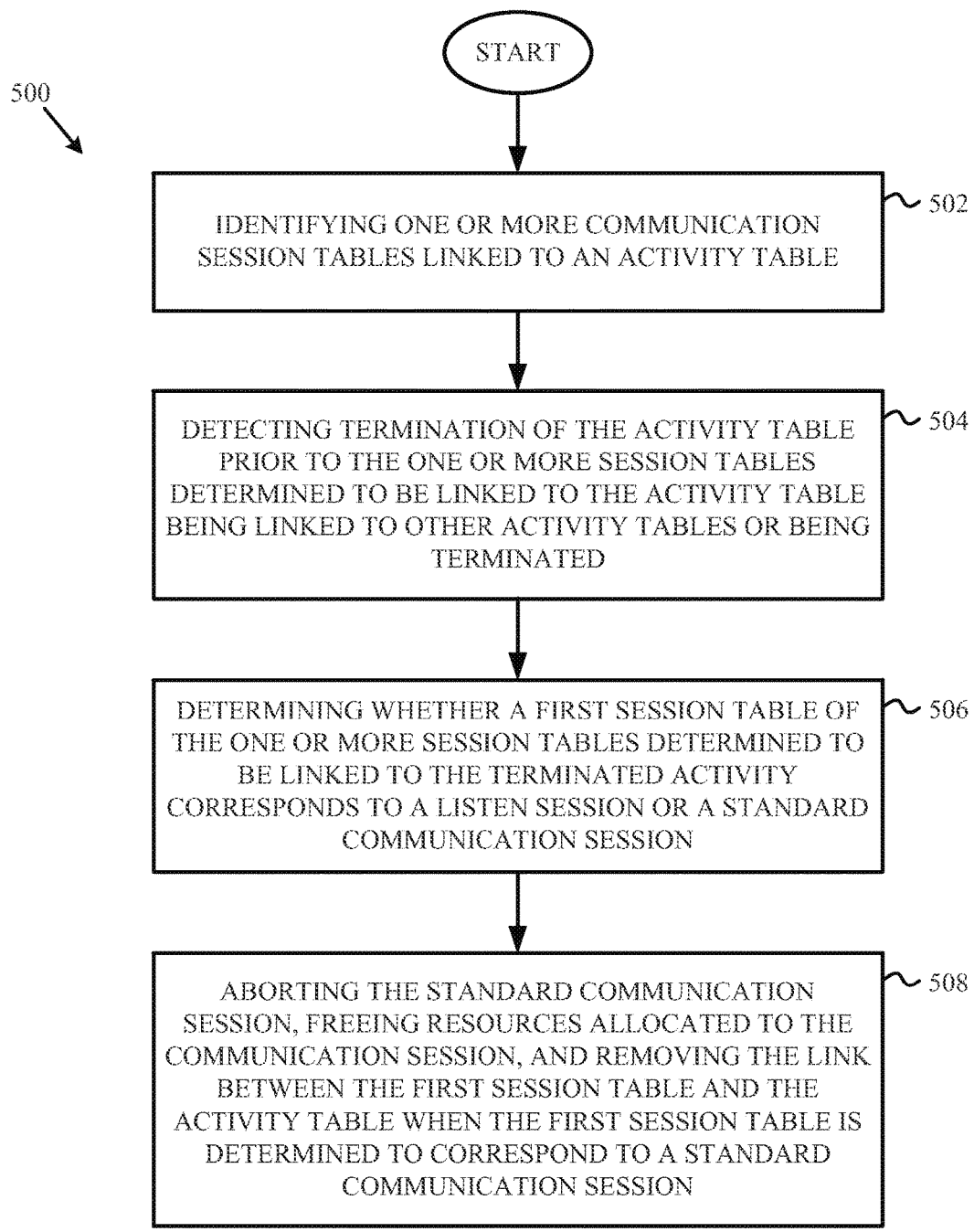
FIG. 5 is a flow chart illustrating a method for avoiding the orphaning of communication sessions when activities are terminated according to one embodiment of the disclosure.

FIG. 5 is a flow chart illustrating a method for avoiding the orphaning of communication sessions when activities are terminated according to one embodiment of the disclosure. In particular, the embodiment illustrated in FIG. 5 may address the problem that arises when an application orphans a session, in which the application may not close associated sessions properly or the application may leave a session in a state where an application thread appears to not own it. It is noted that embodiments of method 500 may be implemented in accordance with the systems and embodiments described herein with respect to FIGS. 1-2 and FIG. 8. For example, embodiments of method 500 may be implemented by a computing system that includes at least a network application, a CS, and a communications platform as illustrated in FIGS. 1-2. In some embodiments, the computing system may be a processor, a server, or a combination of processors and servers, such as a network of processors and servers, and may include one or more components illustrated in FIGS. 1-2 and FIG. 8. In general, embodiments of method 500 may be implemented by other similar systems without deviating from this disclosure so long as the systems, whether directly or indirectly, support the operations as described herein.

Specifically, method 500 includes, at block 502, identifying, by the processor, one or more communication session tables linked to an activity table. Method 500 includes, at block 504, detecting, by the processor, termination of the activity table prior to the one or more session tables determined to be linked to the activity table being linked to other activity tables or being terminated. For example, the computing system on which a CS executes may detect that a call to a close or abort interface of the CS has been called indicating that termination of an activity table has been initiated. In some embodiments, a computing system may mark (flag) the activity table as inactive upon detecting termination of the activity table and determining that there is not one or more sessions linked to the activity table.

At block 506, method 500 includes determining, by the processor, whether a first session table of the one or more session tables determined to be linked to the terminated activity corresponds to a listen session or a standard communication session. In some embodiments, a listen session may be a session created in response to a call to a Listen or Accept interface of a CS, whereas a standard communication session may be a communication session established or opened when the CS receives a request from a remote network application requesting communication with another network application associated with the CS. Method 500 includes, at block 508, aborting the standard communication session, freeing resources allocated to the communication session, and removing the link between the first session table and the activity table when the first session table is determined to correspond a standard communication session. In contrast, when the first session table is determined to correspond to a listen session, the computing system may perform the steps of aborting the listen session, freeing resources allocated to the listen session, closing the listen session, and removing the link between the first session table and the activity table.

In some embodiments, for each session table in addition to the first session table of the one or more session tables determined to be linked to the terminated activity, the computing system may be configured to perform the step of determining whether the additional session table of the one or more session tables determined to be linked to the terminated activity corresponds to a listen session or a standard communication session. In another embodiment, for each session table in addition to the first session table of the one or more session tables determined to be linked to the terminated activity, the computing system may also be configured to perform the step of aborting the additional standard communication session, freeing resources allocated to the additional communication session, and removing the link between the additional session table and the activity table when the additional session table is determined to correspond a standard communication session.

Figure 5B:
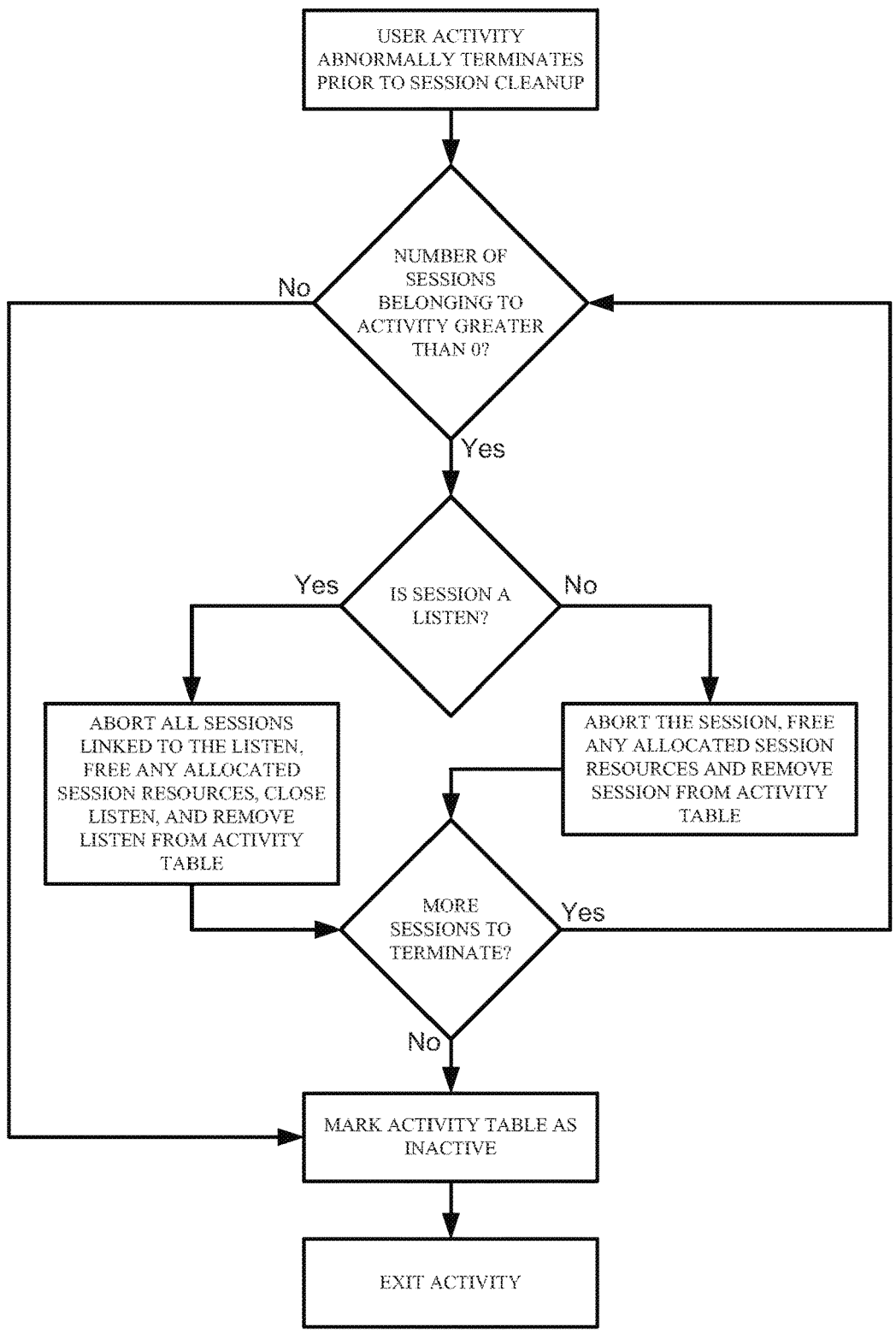
FIG. 5B is a flow chart illustrating process flows which may be implemented as part of a method for avoiding the orphaning of communication sessions when activities are terminated according to one embodiment of the disclosure.

FIG. 5B is a flow chart illustrating process flows which may be implemented as part of a method for avoiding the orphaning of communication sessions when activities are terminated according to one embodiment of the disclosure. However, one of skill in the art will readily recognize that other embodiments illustrating aspects of method 500 may exist and which do no depart from this disclosure.

FIG. 6 is a flow chart illustrating a method for accessing data using authentication credentials different than the authentication credentials associated with a user that is requesting access to the data according to one embodiment of the disclosure. It is noted that embodiments of method 600 may be implemented in accordance with the systems and embodiments described herein with respect to FIGS. 1-2 and FIG. 8. For example, embodiments of method 600 may be implemented by a computing system that includes at least a network application, a CS, and a communications platform as illustrated in FIGS. 1-2. In some embodiments, the computing system may be a processor, a server, or a combination of processors and servers, such as a network of processors and servers, and may include one or more components illustrated in FIGS. 1-2 and FIG. 8. In general, embodiments of method 600 may be implemented by other similar systems without deviating from this disclosure so long as the systems, whether directly or indirectly, support the operations as described herein.

Specifically, method 600 includes, at block 602, authenticating, by a processor, a first set of authentication credentials associated with a first user during a first call to an API of a first set of APIs associated with a first network application executing in a first OS platform. At block 604, method 600 includes storing, by the processor, the authenticated first set of authentication credentials on the first OS platform. For example, as noted with reference to FIG. 2, a first user may be a user that accesses a network application and causes the network application to issue a call to an Accept interface of a CS. As part of the functions executed in response to the call to the Accept interface, the user's authentication credentials may be authenticated. The authenticated credentials may be stored in memory within or external to the computing system.

Method 600 includes, at block 606, receiving, by the processor, via at least one API of the first set of APIs, from an API of a second set of APIs associated with a second network application executing in a second OS platform, a request to access data during a communication session, wherein a second set of authentication credentials associated with a second user are associated with the received request. In some embodiments, the request may be received in response to input provided to the second network application by a user associated with the second set of authentication credentials. For example, the request to access data may be received from a user accessing a network application from a remote network application through a user interface on the remote network application. The user issuing the request to access data may be different than the user that initiated the communication session, such as the original user that caused the network application to call the Accept interface, therefore the user issuing the request to access data may be associated with different authentication credentials than the user that initiated the communication session with the network application.

At block 608, method 600 includes retrieving, by the processor, the stored authenticated first set of authentication credentials, while at block 610, method 600 includes converting, by the processor, the authentication credentials associated with the request from the second set of authentication credentials to the first set of authentication credentials. For example, the stored authentication credentials that are retrieved may be authentication credentials associated with the user that initiated the communication session with the network application. In some embodiments, the step of converting disclosed at block 610 may include calling an Impersonate interface of a CS, such as Impersonate interface 250 of CS 210 illustrated in FIG. 2. In some embodiments, the computing system may issue the call to the Impersonate interface to switch the authentication credentials associated with the request from the second set of authentication credentials to the first set of authentication credentials because the data for which access is requested may not be accessible using the second set of authentication credentials.

Method 600 includes, at block 612, accessing, by the processor, the data using the authenticated first set of authentication credentials. In some embodiments, accessing may include processing the received request, wherein the request is associated with the authenticated first set of authentication credentials when processed.

In some embodiments, after a network application has finished performing operations that require the original user's authentication credentials, the network application may call another interface, such as an End Impersonate interface (not shown), to initiate reversion of the authentication credentials used for subsequent data accesses from the first set of authentication credentials to the second set of authentication credentials. In some embodiments, reversion may be performed so that subsequent data accesses executed by the first network application are associated with the second set of authentication credentials instead of the first set of authentication credentials.

Figure 7:
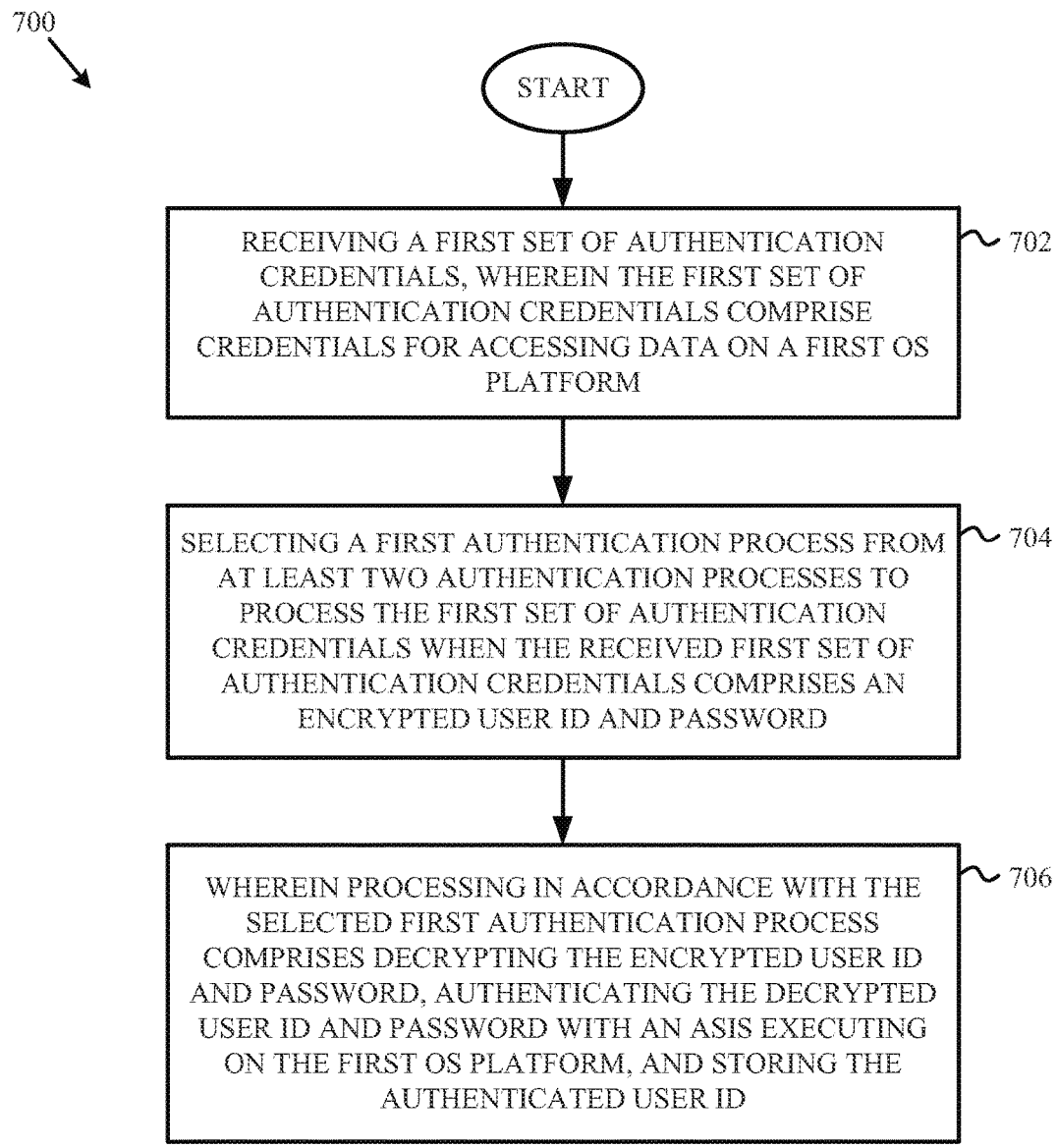
FIG. 7 is a flow chart illustrating a method for authenticating credentials for establishing a secure communication connection between applications executing on different platforms according to one embodiment of the disclosure.

FIG. 7 is a flow chart illustrating a method for authenticating credentials for establishing a secure communication connection between applications executing on different platforms according to one embodiment of the disclosure. It is noted that embodiments of method 700 may be implemented in accordance with the systems and embodiments described herein with respect to FIGS. 1-2 and FIG. 8. For example, embodiments of method 700 may be implemented by a computing system that includes at least a network application, a CS, and a communications platform as illustrated in FIGS. 1-2. In some embodiments, the computing system may be a processor, a server, or a combination of processors and servers, such as a network of processors and servers, and may include one or more components illustrated in FIGS. 1-2 and FIG. 8. In general, embodiments of method 700 may be implemented by other similar systems without deviating from this disclosure so long as the systems, whether directly or indirectly, support the operations as described herein.

Specifically, method 700 includes, at block 702, receiving, by a processor, a first set of authentication credentials, wherein the first set of authentication credentials include credentials for accessing data on a first OS platform, and wherein the first set of authentication credentials include either an encrypted user ID and password or first packaged data generated by a first interface executing on a second OS platform. For example, in one embodiment, a user may access a network application executing in a first OS platform from a remote network application executing in a second OS platform and the user credentials provided by the user may be user credentials for accessing data using operations executable in the first OS platform via the network application executing in the first OS platform. In some embodiments, the user credentials may not be associated with the second OS platform such that the authentication credentials do not allow the remote network application to access data on the second OS platform via operations initiated by the remote network application.

At block 704, method 700 includes selecting, by the processor, a first authentication process from at least two authentication processes to process the first set of authentication credentials when the received first set of authentication credentials includes an encrypted user ID and password. At block 706, method 700 specifies that processing, by the processor, the first set of authentication credentials in accordance with the selected first authentication process may include decrypting the encrypted user ID and password, authenticating the decrypted user ID and password with an authentication and session initiation subsystem (ASIS) executing on the first OS platform, and storing the authenticated user ID. In some embodiments, processing the first set of authentication credentials in accordance with the selected first authentication process may establish a secure communication connection between an application executing on the first OS platform, such as a local network application, and an application executing on the second OS platform, such as a remote network application. In some embodiments, a network application executing on the first OS platform may use the stored authenticated user ID to access data within the first OS platform.

In some embodiments, the computing system on which a CS executes may select a second authentication process from the at least two authentication processes to process the first set of authentication credentials when the received first set of authentication credentials comprises the first packaged data. According to an embodiment, processing the first set of authentication credentials in accordance with the selected second authentication process may include authenticating the first packaged data with the ASIS and transmitting to an application executing on the second OS platform second packaged data generated on the first OS platform. Processing the first set of authentication credentials in accordance with the selected second authentication process may also include receiving third packaged data generated by the first interface executing on the second OS platform in response to validation of the second packaged data on the second OS platform, authenticating the third packaged data with the ASIS, and storing the authenticated third package data.

According to some embodiments, while authenticating potential users, if the computing system detects an invalid authentication attempt, such as an invalid user ID or password combination, the computing system may log the event and save the Internet Protocol (IP) address from which the request originated in a table of failed addresses. Each subsequent failed authentication may increment the number of invalid attempts associated with an IP address. In some embodiments, if a predetermined number of invalid attempts occur from a single IP address, the computing system may ignore future attempts to authenticate the user, such as by not evaluating or authenticating the credentials being supplied. According to an embodiment, invalid attempts to authenticate may result in aborted connections.

In some embodiments, a computing system may also log the time of the first failed attempt such that after a predetermined amount of time has passed the IP address associated with the failed attempts may be cleared of any failures so that future authentication attempts may be evaluated for authentication.

The schematic flow chart diagrams of FIGS. 3-7 are generally set forth as a logical flow chart diagrams. As such, the depicted order and labeled steps are indicative of one embodiment of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 8:
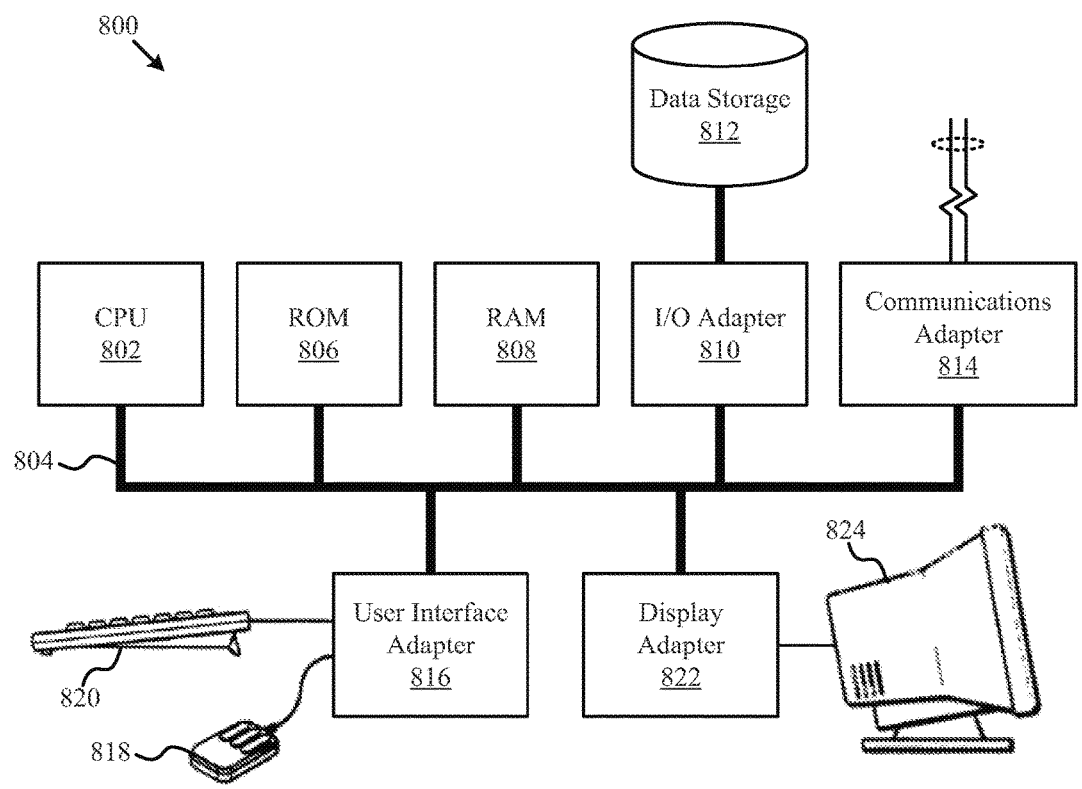
FIG. 8 is a block diagram illustrating a computer system according to one embodiment of the disclosure.

FIG. 8 illustrates a computer system 800 adapted according to certain embodiments of a server and/or a user interface device. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The 1/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to a network, which may be one or more of a LAN, WAN, and/or the Internet. The user interface adapter 816 couples user input devices, such as a keyboard 820, a pointing device 818, and/or a touch screen (not shown) to the computer system 800. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server and/or the user interface device 810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 800 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for maintaining ownership of sessions by applications, comprising:
    obtaining, by a processor, a communication session table, wherein the communication session table comprises a data structure with information used to establish and maintain a communication session between network applications;
    determining, by the processor, if an activity table exists, wherein an activity table comprises a list of operations scheduled for execution;
    creating an activity table when an activity table is determined to not exist;
    determining, by the processor, when an activity table is determined to exist, if the session table is linked to the activity table or to another activity table;
    linking, by the processor, the session table to the activity table when the activity table is determined to exist, the session table is determined to not already be linked to the activity table, and the session table is referenced by the activity table; and
    performing, by the processor, a computer instruction requested by a user on the communication session identified in the session table when the activity table exists and the session table is linked to the activity table,
    wherein, when the session table is determined to be linked to the another activity table, the method further comprises:
        stopping an un-owned session timer associated with the session table;
        removing the link between the session table and the another activity table and
        linking the session table to the activity table.

2. The method of claim 1, wherein obtaining comprises receiving a request to establish a communication session, and wherein the request includes the session table.

3. The method of claim 1, wherein obtaining comprises creating the session table.

4. The method of claim 1, further comprising starting an un-owned session timer when the session table is determined to not be linked to an activity table, wherein when the timer expires the session is aborted if the session is valid, and no action is taken if the session is not valid.

5. A computer program product, comprising:
    a non-transitory computer readable medium comprising instructions which, when executed by a processor of a computer system, cause the processor to perform the steps of:
    obtaining a communication session table, wherein the communication session table comprises a data structure with information used to establish and maintain a communication session between network applications;
    determining if an activity table exists, wherein an activity table comprises a list of operations scheduled for execution;
    creating an activity table when an activity table is determined to not exist;
    determining when an activity table is determined to exist, if the session table is linked to the activity table or to another activity table;
    linking the session table to the activity table when the activity table is determined to exist, the session table is determined to not already be linked to the activity table, and the session table is referenced by the activity table; and
    performing a computer instruction requested by a user on the communication session identified in the session table when the activity table exists and the session table is linked to the activity table,
    wherein the medium further comprises instructions to cause the processor to perform the following steps, when the session table is determined to be linked to the another activity table:

stopping an un-owned session timer associated with the session table;

removing the link between the session table and the another activity table; and linking the session table to the activity table.

6. The computer program product of claim 5, wherein obtaining comprises receiving a request to establish a communication session, and wherein the request includes the session table.

7. The computer program product of claim 5, wherein obtaining comprises creating the session table.

8. The computer program product of claim 5, wherein the medium further comprises instructions which cause the processor to perform the step of starting an un-owned session timer when the session table is determined to not be linked to an activity table, wherein when the timer expires the session is aborted if the session is valid, and no action is taken if the session is not valid.

9. An apparatus, comprising:

a memory; and a processor coupled to the memory, wherein the processor is further configured to perform the steps of:

obtaining a communication session table, wherein the communication session table comprises a data structure with information used to establish and maintain a communication session between network applications;

determining if an activity table exists, wherein an activity table comprises a list of operations scheduled for execution;

creating an activity table when an activity table is determined to not exist;

determining when an activity table is determined to exist, if the session table is linked to the activity table or to another activity table;

linking the session table to the activity table when the activity table is determined to exist, the session table is determined to not already be linked to the activity table, and the session table is referenced by the activity table; and performing a computer instruction requested by a user on the communication session identified in the session table when the activity table exists and the session table is linked to the activity table, wherein the processor is further configured to perform the following steps, when the session table is determined to be linked to the another activity table:

stopping an un-owned session timer associated with the session table;

removing the link between the session table and the another activity table; and linking the session table to the activity table.

10. The apparatus of claim 9, wherein obtaining comprises receiving a request to establish a communication session, and wherein the request includes the session table.

11. The apparatus of claim 9, wherein obtaining comprises creating the session table.

12. The apparatus of claim 9, wherein the processor is further configured to perform the step of starting an un-owned session timer when the session table is determined to not be linked to an activity table, wherein when the timer expires the session is aborted if the session is valid, and no action is taken if the session is not valid.

* * * * *